United States Patent [19]

Gebhardt

[11] 3,939,962
[45] Feb. 24, 1976

[54] STOW ROLLER TRAIN FOR STORAGE AND CONVEYANCE OF CARGO

[76] Inventor: Richard Gebhardt, H. Thomastrasse 10, 6920 Sinsheim, Germany

[22] Filed: Mar. 19, 1973

[21] Appl. No.: 342,436

[52] U.S. Cl. ............................................. 198/127 R
[51] Int. Cl.² ......................................... B65G 13/02
[58] Field of Search ..................................... 198/127

[56] References Cited
UNITED STATES PATENTS
3,669,242  6/1972  Berthelat......................... 198/127 R
3,718,248  2/1973  Muller............................. 198/127 R FOREIGN PATENTS OR APPLICATIONS
1,543,506  10/1968  France............................ 198/127 R Primary Examiner—Evon C. Blunk
Assistant Examiner—Joseph E. Valenza
Attorney, Agent, or Firm—Craig & Antonelli

[57] ABSTRACT

Stow roller train for the storage and conveyance of cargo with rotatable cargo supporting rollers which can be coupled, by means of respectively one intermediate roller for each supporting roller which is movable into the driving or idling position, with a constantly moving traction means. Each intermediate roller is disposed in an axially fixed manner with respect to its axis of rotation and is radially adjustably movable with respect to this axis. A control force mechanism is effective on the intermediate rollers in the direction of the driving position. In a first embodiment, the intermediate rollers are continuously in contact with a drive belt serving as the traction means. Springs or lever and weight arrangements for the control force mechanism apply a predetermined force on the intermediate rollers toward the driving position. The intermediate rollers are radially movable away from the driving position in response to excess reaction forces at the cargo supporting rollers. The belt may be reversible to give different driving forces in opposite directions. In another embodiment, the intermediate rollers are mounted on pairs of toggle levers which include abutments removing the intermediate rollers from driving engagement with one or both of the drive belt and cargo supporting rollers.

19 Claims, 6 Drawing Figures

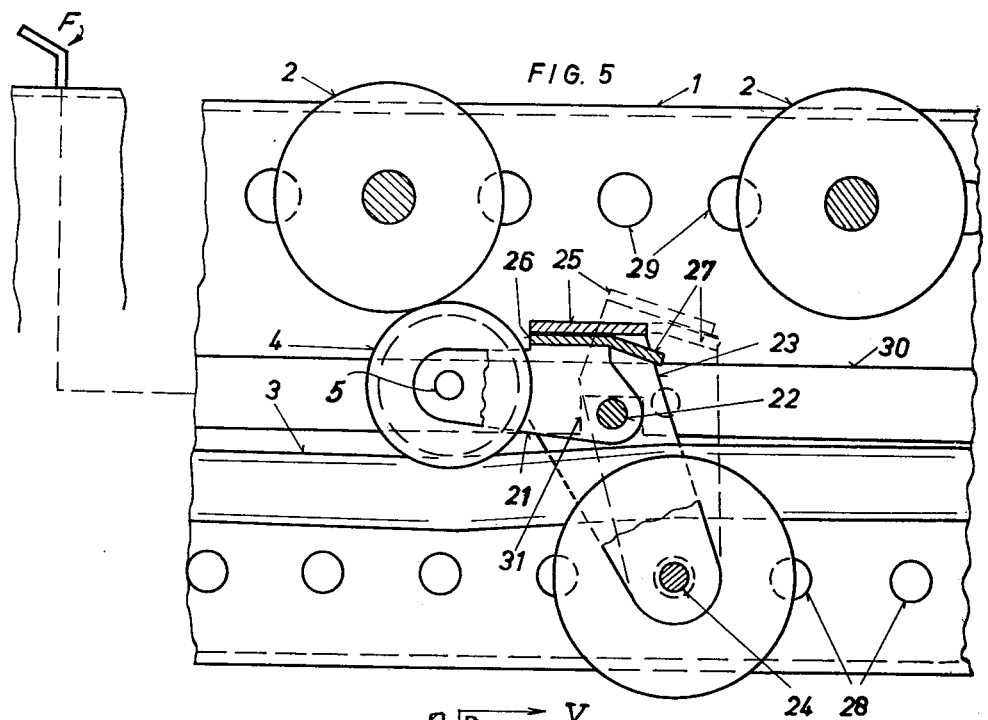
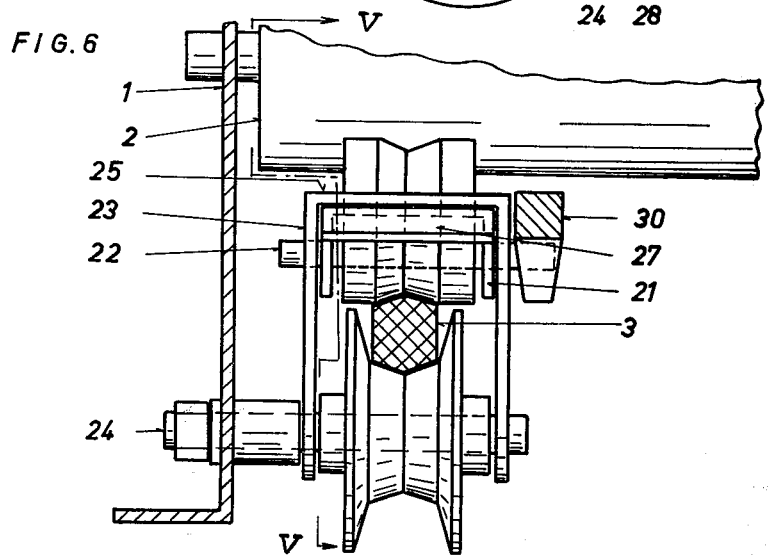

ic patent 3,939,962

STOW ROLLER TRAIN FOR STORAGE AND CONVEYANCE OF CARGO

BACKGROUND AND SUMMARY OF THE INVENTION

This invention relates to a stow roller train for the storage and conveyance of cargo or piece goods which includes rotatable cargo supporting rollers which can be coupled with a constantly moving traction means by respectively one intermediate roller movable into the driving position or into the idling position.

It has been contemplated to construct stow roller trains wherein the intermediate or spacer rollers of several cargo supporting rollers are combined into groups and are moved substantially forcibly into the driving or idling position by a feeler actuated by the transported cargo. Thus, a separate control system is provided for the adjustment of the intermediate rollers, which system operates only in a predetermined transport direction. Furthermore, stow roller trains have been contemplated wherein the supporting rollers are suspended at one end in the manner of a pendulum, so that they come into contact with the traveling traction means at their lowest position, while they pivot from the driving position into the idling position in case of a resistance effective of the cargo to be transported. Since this pivotal movement takes place against the weight of the cargo disposed on the supporting roller, the cargo being lifted during this step, the frictional forces occurring in the stowing position are considerable. Consequently, a considerable increase in the driving power of the traction means is required during the stowing of the cargo, and simultaneously an increased wear and tear is exerted on the supporting rollers and/or the traction means. Furthermore, these disadvantageous consequences are increased with an increasing weight of the cargo, and the counterforce for arresting the cargo for stowing and storage is likewise enlarged. This can result in damage to sensitive cargo.

Therefore, it is an object of this invention to provide an adjustment for the intermediate rollers which is sensitive in its response to resistance forces and simple in its construction.

This object is attained, according to the invention, by disposing each intermediate roller axially fixedly, but radially movably, so that it rests on the traction means and is adjustable between the driving position and the idling position, and by equipping each intermediate roller with means for producing a control force effective in the direction of the drive position.

An especially sensitive adjustability of the intermediate roller is obtained, in accordance with another feature of this invention, by providing that the means producing the control force are effective on the intermediate roller without impeding its free radial adjustability between the supporting roller and the traction means. That is, once the control force is overcome by counterforces, the intermediate roller can move freely away from its driving position.

This invention also contemplates preferred means for producing the control force fashioned as a spring or a weight.

The invention also contemplates providing that the size of this control force can be adjusted and thus adapted to the weight of the cargo to be conveyed.

The advantages attained by the present invention reside particularly in that a transmission of the rotary motion to the supporting rollers of the stow roller train is achieved which operates in a sensitive manner and is optionally adjustable. Independently of the load on the supporting rollers, exerted by the pieces of cargo, the intermediate rollers try to maintain the supporting rollers in rotation only in dependence on the conveying resistance, each intermediate roller being adjustable individually between the driving and idling positions. By the optional adjustability of the size of the control force, the stow roller train can be adapted to a great variety of different conditions of application. The use of the roller train as a storage train with a reversible drive of the traction means furthermore makes it possible to effect the storing operation in a sensitive manner with minor stowing forces between the pieces of cargo, and to accomplish a rapid unloading in the opposite direction with high forces of acceleration. This opens up additional fields of application for the stow roller train of the present invention.

The above-mentioned and further objects, features and advantages of the present invention will become more obvious from the following description when taken in connection with the accompanying drawing which shows, for purposes of illustration only, several embodiments in accordance with the present invention.

BRIEF DESCRIPTION OF THE DRAWINGS

FIG. 5 is a longitudinal sectional schematic view taken along V—V of FIG. 6 of another embodiment of a stow roller train installation in accordance with the present invention; and FIG. 6 is a partial cross sectional view through the stow roller train installation of FIG. 5.

DETAILED DESCRIPTION OF THE DRAWINGS

Figure 1:
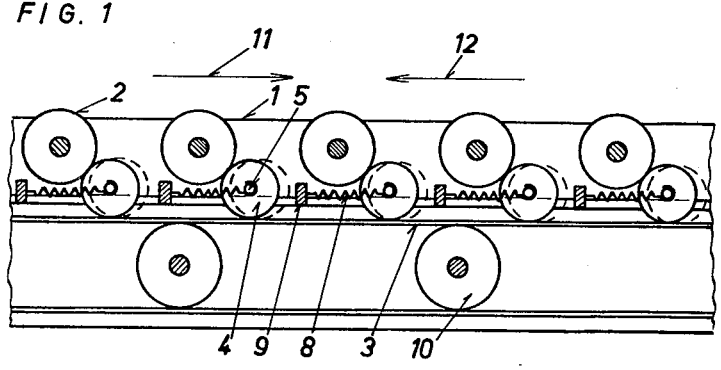
FIG. 1 is a longitudinal sectional schematic view of a stow roller train installation in accordance with the present invention.
Figure 2:
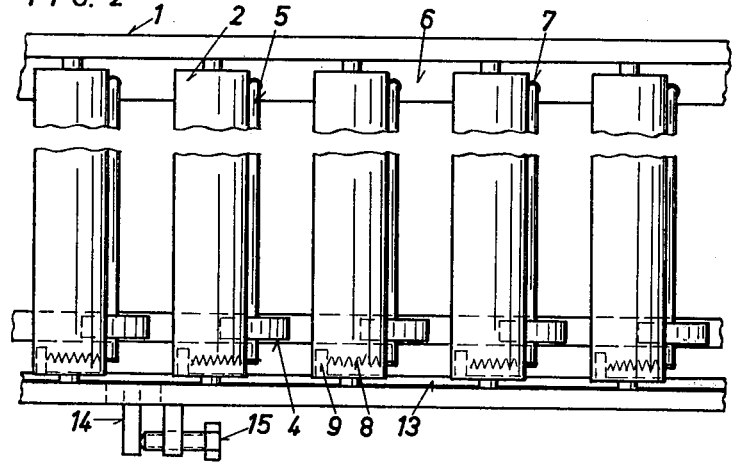
FIG. 2 is a top view of the stow roller train installation according to FIG. 1.

According to FIGS. 1 and 2, the stow roller train consists of two parallel frames 1, between which a plurality of cargo supporting rollers 2 is mounted transversely in a series and in a freely rotatable manner. A moving endless traction means 3, for example in the form of a belt or band, is arranged at a spacing underneath these supporting rollers 2. At the ends of the stow roller train, this endless traction means or belt 3 is guided by belt guide rollers, (not shown), one of which belt guide rollers is driven in any desired manner. Respectively one intermediate roller 4, rotatably supported on a swivel axle 5, is provided between the traction means 3 and each supporting roller 2. The end of the swivel axle 5 remote from the intermediate roller 4, is inserted in a web 6 connected to the frame 1, so that the intermediate roller 4 can pivot radially about this pivot point 7, but still constantly rests on the traction means 3. In one end point of the adjusting motion, the intermediate roller 4, assumes the driving position and, in the other end point, it assumes the idling position. In the driving position, the intermediate roller is in contact with the supporting roller 2 and the traction means 3, and due to the rotating traction means 3, transmits a rotary motion to the supporting roller 2, in order to impart a movement in the longitudinal direction to the cargo disposed on the supporting roller. The intermediate roller 4, moves toward the right in order to attain the idling position, so that the transmission of the rotary motion from the traction means 3 to the supporting roller 2 is interrupted. In order to return the intermediate roller 4 automatically into the driving position and maintain the roller in this position, a control force is constantly effective on the intermediate roller which tends to hold the latter in the illustrated driving position in an elastically resilient manner.

In the embodiment of FIGS. 1 and 2, a spring 8 serves as the means for providig such a control force. One end of this spring 8 is attached to the swivel axle 5 and the other end is mounted to a fixed point 9. When the traction means 3, supported by traction means supporting rollers 10, rotates in the clockwise direction, the cargo moves in the direction of arrow 11 from the left to the right. When the cargo encounters a resistance, for example an already arrested piece of cargo, then the supporting roller 2 can come to a standstill, since the intermediate roller 4 moves from the driving position against the force of spring 8 into the idling position wherein the transmission of motion is interrupted. The direction of travel of the traction means 3 supports this operation and establishes a sliding connection wherein the sliding parts contact one another only slightly. The cargo is then held in contact with the piece of cargo disposed in front thereof, by means of the relatively minor static friction between the arrested supporting roller 2 and the rotating traction means 3, and is immediately set into motion again as soon as the resistance has been eliminated.

Such a stow roller train can serve as a stowing and storage roller train wherein the pieces of cargo are stowed in close proximity one behind the other and are fed in dependance with the removal of the pieces of cargo, in the direction of arrow 11. This stow roller train car, however, also be used by first stowing the pieces of cargo which have been transported in the direction of arrow 11 (FIG. 1). For this purpose, the stow roller train has a fixed abutment at the right-hand end, which is not illustrated, so that pieces of cargo can be stored until maximally the entire stow roller train is occupied. For discharge purposes, the direction of travel of the traction means 3 is reversed, so that a transport motion of the pieces of cargo results which is in the direction of the arrow 12, from the right toward the left. Since, in this driving direction, the intermediate rollers 4 are pulled additionally into the inter-space between the supporting roller 2 and the traction means 3, due to the reversed direction of force, a very intense force transmission takes place, and thus an accelerated discharge of the stow roller train is accomplished so that the latter is available for the subsequent storage operation within a short period of time.

In order to be able to adapt the size of the control force to the pieces of cargo to be conveyed, as well as to the installation conditions of the stow roller train, the fixed point 9 of the spring 8 can be made adjustable in the force direction. The adjustment can be effected individually for each spring 8 and/or for several springs together. For this purpose, the fixed points 9 can be arranged on a rail 13 displaceably mounted to the frame 1. An abutment 14 serves for adjusting purposes; this abutment extends through a slotted hole in the frame 1 and contacts a setscrew 15.

Figure 3:
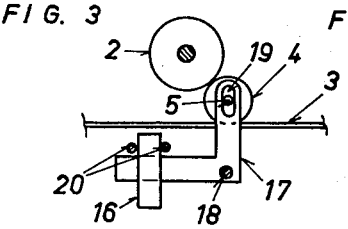
FIG. 3 is a lateral view of a supporting roller with an intermediate roller loaded by a weight in accordance with a further embodiment of the present invention.
Figure 4:
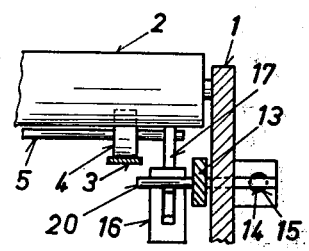
FIG. 4 is a partial cross sectional view through the arrangement according to FIG. 3 with an additional adjusting means.

The embodiment of FIGS. 3 and 4 differs from the embodiment of FIGS. 1 and 2 in that the spring 8 is replaced by a weight 16 seated on the horizontal arm of an angle lever 17. The angle lever 17 pivots about an axle 18 fixedly mounted to the frame and encompasses, with a slotted hole 19 in the vertical arm, the axle 5 of the intermediate roller 4. The mode of operation corresponds generally to that described above for the FIG. 1 embodiment. The weight 16 can also be additionally adjusted. For this purpose, the weight can be shifted on the horizontal arm of the angle lever 17 by means of bifurcated entraining elements 20. The entraining elements 20 are attached to the above-mentioned rail 13.

The means 8 and 16 for producing the control engage the intermediate roller 4 and/or the axle 5 thereof in such a manner that the free adjustability thereof between the supporting roller 2 and the traction means 3 is preserved. It will be understood that the mounting of the intermediate roller 4 can be fashioned differently from that shown in the drawing within the intendment of the present invention. For example, the control force could be directed obliquely downwardly against the traction means 3 in order to obtain a markedly greater transmission between the traction means 3 and the intermediate roller 4 than between the intermediate roller 4 and the supporting roller 2.

According to the embodiment of FIGS. 5 and 6, the intermediate roller 4 is rotatably mounted at a lever 21, which lever 21 is hingedly joined to a second lever 23 by means of an axle 22. The two levers 21 and 23 form a toggle joint, the lever 23 of which rests pivotably on an axle 24 attached to the frame 1. Both levers 21 and 23 are U-shaped and telescoped one into the other, so that the webs 25 and 26 serve simultaneously as stops and are in engagement in the driving position, as shown in solid lines in FIG. 5. The intermediate roller 4 is movable in a circular path about the axle 24 so as to be lifted off the supporting roller 2 in response to resistance at roller 2. As a consequence thereof, an overloading of the drive connection and thus of the intermediate roller 4 is avoided. Prior to reaching this overload point, the intermediate roller 4 can radially freely adjust itself between the supporting roller 2 and the traction means 3, while it is guided axially by the toggle joint 21 and 23.

As means for producing the control force oriented into the driving position, the levers 21 and 23 are disposed to be inclined in the direction of the driving position. Due to the center of gravity of the intermediate roller assembly being between the axle 24 and the supporting roller 2, there is constantly the tendency to move the intermediate roller 4 into its driving position. In order to maintain this control force also in the idling position, the levers 21 and 23 are are provided with additional stops which contact each other in the idling position. Thereby, a rigid lever connection is established which lifts the lever 21 with the intermediate roller 4, the latter being detached from the traction means 3. The stops are the already mentioned stop 25 and an extension 27 of the stop 26 arranged at an angle thereto.

An easy assembly of the supporting roller drive is accomplished, according to the FIGS. 5 and 6 embodiment of this invention, by providing that the toggle joint and levers 21, 23 forms an independent structural unit with the intermediate roller 4, which unit can be inserted in prefabricated bores 28 in the frame 1 with the aid of the axle 24, which latter can be attached by screws. These bores 28 are predeterminedly positioned with respect to bores 29 provided for the supporting rollers 2. The frames 1 consequently form unit frames wherein the supporting rollers 2 and the drive units 4, 21, 23 are inserted in accordance with the desired graduation. That is, the desired inclination of the drive units 4, 21, 23 can be adjusted by the selection of appropriate bores 29 and 28 for the axle of the cargo support roller and the axle 24. In this way, a rapid and economical manufacture and assembly are obtained which additionally are independent of the width of the stow roller train.

A control means 30, connected with a feeler F, can serve for adjusting the intermediate rollers 4 between the driving and idling positions. The feeler is displaced by the moving pieces of cargo and thereby moves the group of intermediate rollers 4 connected with the control means 30 from the driving position into the idling position. The reverse setting is accomplished in the manner described above by the means (including gravity forces) for producing the control force. The control means 30 is connected to the extended axle 22 of the toggle joint 21, 23; the cutout 31 provided for this purpose surrounds the axle 22 with a lateral play in order to fully preserve the free adjustability of the intermediate roller 4.

While I have shown and described only several embodiments in accordance with the present invention, it is understood that the same is not limited thereto but also contemplates numerous changes and modifications as would be known to those skilled in the art given the present disclosure of the invention, and I therefore do not wish to be limited to the details shown and described herein only schematically but intend to cover all such changes and modifications.

I claim:

1. A stow roller train installation for storing and conveying cargo; said installation comprising:
   support means;
   at least one rotatable cargo supporting roller directly engageable with cargo to be stored and conveyed;
   continuously movable traction means;
   at least one rotatable intermediate roller interposed between said at least one cargo supporting roller and said traction means;
   means for mounting said at least one rotatable cargo roller on said support means;
   means operatively connected with each of said at least one intermediate rollers for adjustably mounting each of said intermediate rollers to be independently displaceable between a driving position with the intermediate roller drivingly connecting the traction means and one of said at least one cargo supporting rollers and an idling position with the intermediate roller and the traction means out of driving connection with one of said at least one cargo supporting roller;
   said means for adjustably mounting each of said at least one intermediate rollers including control force means for providing a continuous individual adjusting control force on each of said at least one intermediate rollers in the direction of the driving position;
   said means for adjustably mounting each of said at least one intermediate rollers includes means for axially fixing the axis of rotation of said intermediate rollers and for permitting movement in a radial direction with respect to said axis between said driving and idling positions;
   said means for axially fixing the intermediate roller and permitting movement in the radial direction includes at least one first lever and means for disposing each of said intermediate rollers on a respective first lever;
   said control force means including means provided on said support means for supporting said first lever so as to be obliquely pivotable in a direction toward the driving position of the respective intermediate roller;
   said means for disposing each of said at least one intermediate rollers is a second lever hingedly connected to a respective first lever, said second lever directly rotatably supporting a respective intermediate roller;
   said control force means further includes abutments provided on said first and second levers which are engageable with one another to lift the respective intermediate roller away from engagement with the associated cargo supporting roller while maintaining engagement of said traction means and said intermediate roller.

2. An installation according to claim 1, wherein said first and second levers are hingedly joined by an axle, wherein control means are attached to said axle for moving said intermediate roller toward said idle position, and wherein the weight of said intermediate roller and said levers normally biases said intermediate roller towards said driving position.

3. An installation according to claim 1, wherein said control force means is constructed such that each of said at least one intermediate rollers can move in radial directions away from said driving position in response to reaction forces from said cargo supporting rollers that are greater than said adjusting control force, whereby the maximum driving forces transferred between said traction means and said at least one cargo supporting roller by said at least one intermediate roller are dependent on said adjusting control force.

4. An installation according to claim 3, further comprising adjusting means for varying the adjusting control force applied by said control force means.

5. An installation according to claim 4, wherein said adjusting means includes a single adjusting unit for simultaneously varying the adjusting control force applied at a plurality of intermediate rollers.

6. An installation according to claim 3, wherein said control force means includes means for directing said adjusting control force in an oblique downward direction toward said traction means with respect to said respective intermediate rollers.

7. An installation according to claim 3, wherein said traction means is driveable in both a direction corresponding to the direction of the adjusting control force and an opposite direction, whereby different maximum driving forces are transmitted by said intermediate rollers in one direction than in the other opposite direction.

8. An installation according to claim 1, wherein said control force means further includes additional abutments on said first and second levers which are engageable with one another to lift the respective intermediate roller to said idling position with said intermediate roller out of engagement with both said cargo supporting roller and said traction means thereby maintaining a control force in the idling position.

9. An installation according to claim 8, wherein said supporting means includes a frame for housing said cargo supporting and intermediate rollers, said means for mounting said first lever includes bores provided in said frame, and wherein said first and second levers and associated intermediate rollers form a structural unit which is detachably connectable in said bores provided in said frame.

10. A stow roller train installation for storing and conveying cargo; said installation comprising:
support means;
a plurality of cargo supporting rollers directly engageable with cargo to be stored and conveyed;
continuously movable traction means;
a plurality of rotatable intermediate rollers with at least one rotatable intermediate roller being interposed between one of said plurality of cargo supporting rollers and said traction means, said at least one rotatable intermediate roller being driven by said traction means;
means for mounting said cargo rollers on said support means;
means operatively connected with each of said intermediate rollers for adjustably mounting each of said intermediate rollers to be independently displaceable between a driving position with the intermediate roller drivingly connecting the traction means and one of said cargo rollers and an idling position with the intermediate roller and the traction means out of driving connection with said cargo roller;
said means for adjustably mounting each of said intermediate rollers including control force means for providing a continuous individual adjusting control force on each intermediate roller in the direction of the driving position;
said means for adjustably mounting each intermediate roller includes means for axially fixing the axis of rotation of said intermediate roller and for permitting movement in a radial direction with respect to said axis between said driving and idling position;
said control force means being constructed such that each of said intermediate rollers can move in radial directions away from said driving position in response to reaction forces from said cargo rollers that are greater than said adjusting control force, whereby the maximum driving forces transferred between said traction means and a respective cargo supporting roller and intermediate roller are dependent on said adjusting control force;
said means for axially fixing the axis of rotation of said intermediate rollers and for permitting movement in the radial direction includes at least one first lever and means for disposing each of said intermediate rollers on a respective lever;
said control force means includes means provided on said support means for mounting said first lever so as to be obliquely pivotable in a direction toward the driving direction of the respective intermediate roller;
said means for disposing each of said intermediate rollers on a respective lever includes a second lever hingedly connected to a respective first lever, said second lever directly rotatably supporting the respective intermediate roller;
said control force means further includes abutments provided on said first and second levers which are engageable with one another to lift the respective intermediate roller away from engagement with the associated cargo supporting roller while maintaining engagement of said traction means and intermediate roller.

11. An installation according to claim 10, wherein said traction means is driveable in both a direction corresponding to the direction of the adjusting control force and an opposite direction, whereby different maximum driving forces are transmitted by said intermediate rollers in one direction than in the other opposite direction.

12. An installation according to claim 10, wherein said control force means further includes additional abutments on said first and second levers which are engageable with one another to lift the respective intermediate roller to said idling position with said intermediate roller out of engagement with both said cargo supporting roller and said traction means.

13. An installation according to claim 12, wherein said first and second levers are hingedly joined by an axle, wherein control means are attached to said axle for moving said intermediate roller toward said idle position, and wherein the weight of said intermediate roller and said levers normally biases said intermediate roller towards said driving position.

14. An installation according to claim 12, wherein said supporting means includes a frame for housing said cargo supporting and intermediate rollers, said means for mounting said first lever includes bores provided in said frame, and wherein said first and second levers and associated intermediate rollers form a structural unit which is detachably connectable in said bores provided in said frame.

15. An installation according to claim 14, wherein said frame includes a plurality of further bores for detachably connecting said cargo-supporting rollers.

16. An installation according to claim 10, wherein said supporting means includes a frame for housing said cargo supporting and intermediate rollers, said means for mounting said first lever includes bores provided in said frame, and wherein said first and second levers and associated intermediate rollers form a structural unit which is detachably connectable in said bores provided in said frame.

17. An installation according to claim 10, wherein said first and second levers are hingedly joined by an axle, wherein control means are attached to said axle for moving said intermediate roller toward said idle position, and wherein the weight of said intermediate roller and said levers normally biases said intermediate roller towards said driving position.

18. An installation according to claim 10, wherein said traction means is an endless flat belt.

19. An installation according to claim 18, wherein said intermediate rollers are continuously in driving engagement with said flat belt.

* * * * *